United States Patent
Grant et al.

(10) Patent No.: US 8,213,181 B2
(45) Date of Patent: Jul. 3, 2012

(54) APPARATUS FOR A MOVABLE CHASSIS CONFIGURATION

(75) Inventors: Silas Joe Grant, London (GB); Daniel Gratiot, London (GB); Chee Yee Wong, London (GB); Christian Lyngsøe Svejgaard, Taastrup (DK); Giovanni Nigel Vincente Ziani De Ferranti, Broenshoej (DK)

(73) Assignee: Nokia Corporation, Espoo (FI)

( * ) Notice: Subject to any disclaimer, the term of this patent is extended or adjusted under 35 U.S.C. 154(b) by 420 days.

(21) Appl. No.: 12/459,232

(22) Filed: Jun. 29, 2009

(65) Prior Publication Data

US 2010/0328900 A1  Dec. 30, 2010

(51) Int. Cl.
*H05K 5/00* (2006.01)
*H04M 1/00* (2006.01)

(52) U.S. Cl. .................................. 361/730; 455/575.4

(58) Field of Classification Search ........... 361/727, 361/756, 802, 680; 455/575, 575.4, 556.1; 439/374, 377
See application file for complete search history.

(56) References Cited

U.S. PATENT DOCUMENTS

| | | | |
|---|---|---|---|
| 6,233,469 B1 | 5/2001 | Watanabe | 455/575 |
| 7,656,662 B2 * | 2/2010 | Chen | 361/679.55 |
| 7,715,191 B2 * | 5/2010 | Leung | 361/679.56 |
| 7,801,580 B2 * | 9/2010 | Cho et al. | 455/575.4 |
| 7,869,847 B2 * | 1/2011 | Zhou et al. | 455/575.4 |
| 2005/0233785 A1 | 10/2005 | Park et al. | 455/575.4 |
| 2005/0245297 A1 | 11/2005 | Lee et al. | 455/575.4 |
| 2005/0255897 A1 * | 11/2005 | Lee et al. | 455/575.4 |
| 2006/0120029 A1 | 6/2006 | Ryu et al. | 361/680 |
| 2008/0186663 A1 * | 8/2008 | Chen | 361/681 |
| 2008/0242380 A1 * | 10/2008 | Kajihara et al. | 455/575.4 |
| 2009/0163241 A1 | 6/2009 | Vossoughi et al. | 455/556.1 |
| 2009/0209305 A1 * | 8/2009 | Lee et al. | 455/575.4 |
| 2010/0151924 A1 * | 6/2010 | Amano | 455/575.4 |
| 2010/0151925 A1 * | 6/2010 | Vedurmudi et al. | 455/575.4 |
| 2010/0232097 A1 * | 9/2010 | Clerc et al. | 361/679.01 |

FOREIGN PATENT DOCUMENTS

| | | |
|---|---|---|
| FR | 2787278 A1 | 6/2000 |
| JP | 11282623 A | 10/1999 |
| WO | WO 2008/074358 A1 | 6/2008 |

* cited by examiner

*Primary Examiner* — Lisa Lea Edmonds
*Assistant Examiner* — Xanthia C Cunningham
(74) *Attorney, Agent, or Firm* — Harrington & Smith

(57) ABSTRACT

An apparatus including: an intermediate chassis configured to move in at least a first direction and configured to define a reaction surface; a movable chassis configured to move in at least a second direction orthogonal to the first direction and configured to define a follower wherein the reaction surface and follower interact to convert movement of the intermediate chassis and reaction surface in the first direction to movement of the follower and movable chassis in the second direction. Also, an apparatus including a first movable housing portion having side faces including one or more interface components; and a second housing portion; wherein the first movable housing portion is movable relative to the second housing portion between a compact configuration in which the one or more interface components are obscured by the second housing portion and an expanded configuration in which the one or more interface components are exposed.

16 Claims, 7 Drawing Sheets

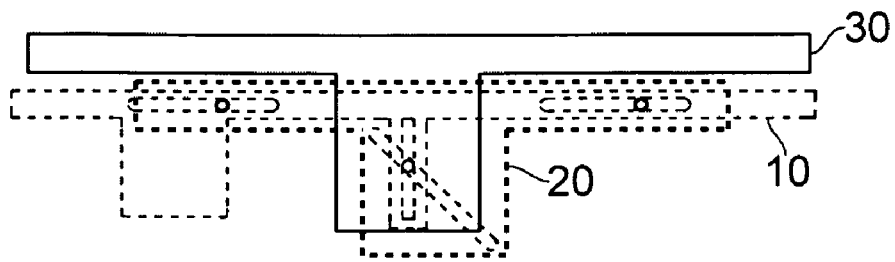
FIG. 3
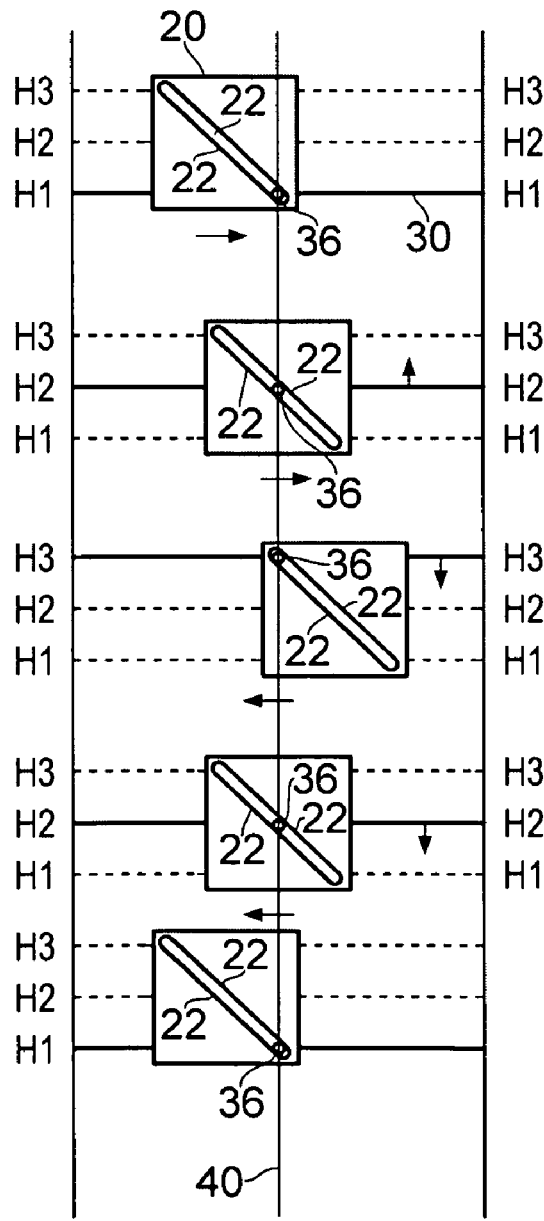
FIG. 4A
FIG. 4B
FIG. 4C
FIG. 4D
FIG. 4E

APPARATUS FOR A MOVABLE CHASSIS CONFIGURATION

FIELD OF THE INVENTION

Embodiments of the present invention relate to an apparatus. Some embodiments relate to an apparatus that can change from a compact configuration to an expanded configuration.

BACKGROUND TO THE INVENTION

It may be advantageous to have an apparatus that can change between a compact configuration and an expanded configuration.

A compact configuration may be advantageous when an apparatus is not in use as size may be more important than utility.

An expanded configuration may be advantageous when an apparatus is in use as utility may be more important than size.

BRIEF DESCRIPTION OF VARIOUS EMBODIMENTS OF THE INVENTION

According to various, but not necessarily all, embodiments of the invention there is provided an apparatus comprising: a driving chassis configured to move in at least a first direction and configured to define a reaction surface; a movable chassis configured to move in at least a second direction orthogonal to the first direction and configured to define a follower wherein the reaction surface and follower interact to convert movement of the driving chassis and reaction surface in the first direction to movement of the follower and movable chassis in the second direction.

The movable chassis may be constrained by the fixed chassis to move in the second direction.

According to various, but not necessarily all, embodiments of the invention there is provided a hand portable electronic apparatus comprising:

a fixed chassis; a driving chassis configured to move relative to the fixed chassis in at least a first direction and configured to define a reaction surface;

a movable display chassis, supporting a display, constrained to move relative to the fixed chassis in substantially a second direction orthogonal to the first direction and configured to define a follower, wherein the fixed chassis comprises a drive mechanism arranged to drive the driving chassis and wherein the reaction surface and follower interact to convert movement of the driving chassis in the first direction to movement of the movable chassis in the second direction.

According to various, but not necessarily all, embodiments of the invention there is provided an apparatus comprising: a first movable housing portion having side faces comprising one or more interface components; and a second housing portion; wherein the first movable housing portion is movable relative to the second housing portion between a compact configuration in which the one or more interface components are obscured by the second housing portion and an expanded configuration in which the one or more interface components are exposed.

BRIEF DESCRIPTION OF THE DRAWINGS

For a better understanding of various examples of embodiments of the present invention reference will now be made by way of example only to the accompanying drawings in which:

FIG. 3 schematically illustrates component parts of the apparatus in an assembled configuration.

FIGS. 4A to 4E illustrate how an intermediate chassis operates as a driving chassis and drives the movable chassis;

DETAILED DESCRIPTION OF VARIOUS EMBODIMENTS OF THE INVENTION

Figure 1:
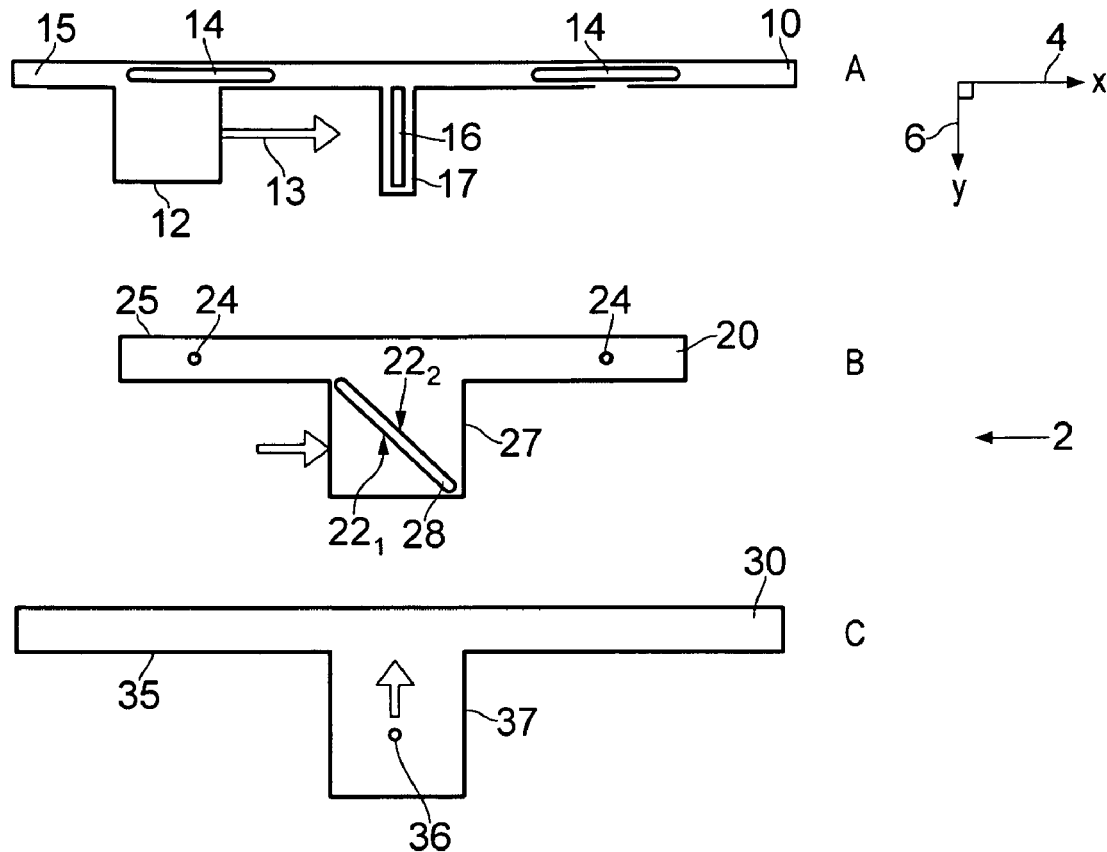
FIG. 1 schematically illustrates component parts of one example of an apparatus in an unassembled configuration.

FIG. 1 schematically illustrates some component parts of an example of an apparatus 2 in an unassembled configuration. FIG. 3 schematically illustrates the component parts in an assembled configuration.

The apparatus 2 comprises: a fixed chassis 10, an intermediate chassis 20 and a movable chassis 30. The movable chassis 30 moves in substantially a second direction 6 relative to the fixed chassis 10 when the apparatus 2 changes between a compact configuration and an expanded configuration.

The term 'chassis' is used to indicate a relatively rigid structure. In some examples, the relatively rigid structure may form a frame. In other examples it may not form a frame. The term 'supporting chassis' is used to indicate a chassis that supports. The term 'driving chassis' is used to indicate a mechanical linkage that is relatively stiff. The movable chassis 30 may be a 'supporting chassis'. One of its purposes is to support other components. The intermediate chassis 20 may be a 'driving chassis'. One of its purposes is to drive the movable chassis 30.

Reciprocating movement of the intermediate chassis 20 in a first direction 4 results in reciprocating movement of the movable chassis 30 in a second direction 6. The first direction 4 and the second direction 6 are orthogonal.

The fixed chassis 10 is fixed relative to the apparatus 2. The fixed chassis 10 supports a drive mechanism 12 configured to provide a driving force 13 to the intermediate chassis 20 in at least the first direction 4. The driving force 13 may be used to reciprocate the intermediate chassis 20 back and forth along the first direction relative to the fixed chassis 10.

In the illustrated example, the fixed chassis 10 comprises a first elongate portion 15 that extends in the first direction and a second portion 17 that extends in the second direction 6.

The first elongate portion 15 in this example comprises a plurality of separated first restraining elements 14 that are aligned with the first direction. The first restraining elements 14 are, in this example, fixed relative to the fixed chassis 10 and are located at a periphery of the fixed chassis along its lateral sides. They interact with second restraining elements 24 of the intermediate chassis 20 to constrain the movement of the intermediate chassis 20, relative to the fixed chassis 10, to the first direction 4.

The second portion 17 of the fixed chassis 10 comprises third restraining elements 16, 38. The third restraining elements 16 are, in this example, fixed relative to the fixed chassis 10 and are located at a periphery of the fixed chassis 10 along its opposing lateral sides. The third restraining elements 16 interact with fourth restraining elements 36 of the movable chassis 30 to constrain the movement of the movable chassis 30, relative to the fixed chassis 10, to substantially the second direction 4.

The intermediate chassis 20 in this illustrated example is constrained by the fixed chassis 10 to move in the first direction 4.

In the illustrated example, the intermediate chassis 20 comprises a first elongate portion 25 that extends in the first direction and a second portion 27 that extends in the second direction 6.

The first elongate portion 25 of the intermediate chassis 20 in this example comprises a plurality of separated second restraining elements 24 that are aligned with the first direction. The second restraining elements 24 are, in this example, fixed relative to the intermediate chassis 20 and are located at a periphery of the intermediate chassis 20 along its opposing lateral sides.

In this example, the first restraining elements 14 of the fixed chassis 10 and the second restraining elements 24 of the intermediate chassis 20 interact to restrain relative movement of the intermediate chassis 20 and the fixed chassis 10 to the first direction 4.

The first restraining elements 14 may be elongate elements that extend in the first direction and the second restraining elements 24 may be engaging elements that engage with the first elongate elements. In the illustrated examples of FIG. 1, the elongate elements 14 are slots that receive pins as the engaging elements.

The second portion 27 of the intermediate chassis 20 is configured to define a reaction surface 22 fixed relative to the intermediate chassis 20. The reaction surface 22 abuts a follower 36 of the movable chassis 30 and the abutment provides a reaction force from the intermediate chassis 20 to the movable chassis 30. The reaction surface 22 is defined so that the movement of the reaction surface 22 in the first direction 4 provides a reaction force to the movable chassis 30 with at least a component in the second direction 6.

The reaction surface 22 defines a backward reaction surface $22_1$ that is pushed forward against the follower 36 during a forward stroke of the reciprocating motion and a forward reaction surface $22_2$ that is pulled back against the follower 36 in a backward stroke of the reciprocating motion.

In the illustrated example, the reaction surface 22 is defined by a slot 28 and the follower 36 is defined by a pin in the slot. The reaction surface 22 is shaped to convert motion of the intermediate chassis 20 in the first direction to motion of the movable chassis 30 in the second direction 6. The shape of the slot 28 may be varied to obtain different relationships between the motion of the intermediate chassis 20 in the first direction and motion of the movable chassis 30. For example, by choosing the shape of the slot 28 the relationship between the speed of motion of the intermediate chassis 20 in the first direction and the speed of motion of the movable chassis 30 in the second direction can be controlled. The slot 28 may in some implementations be arcuate or curved or S-shaped of rectilinear.

In the illustrated example, the slot 28 is a linear slot of constant width and it is angled to lie at an angle intermediate of the first direction 4 and second direction 6. The angled reaction surface 22 converts motion of the intermediate chassis in the first direction to motion of the movable chassis in the second direction 6.

The movable chassis 30 is constrained by the fixed chassis 10 to move substantially in the second direction 6 orthogonal to the first direction 4.

In the illustrated example, the movable chassis 30 comprises a first elongate portion 35 that extends in the first direction and a second portion 37 that extends in the second direction 6.

The second portion 37 of the movable chassis 30 comprises a follower 36 fixed relative to the movable chassis 30 and located at a periphery of the movable chassis 30 along its opposing lateral sides.

The second portion 37 of the movable chassis 30 comprises a fourth restraining element fixed relative to the movable chassis 30 and located at a periphery of the movable chassis 30 along its opposing lateral sides. In the illustrated example, the follower 36 also operates as a part of the fourth restraining element.

The fourth restraining element 36 of the movable chassis 30 and the third restraining element 16 of the fixed chassis 10 interact to restrain relative movement between the movable chassis 30 and the fixed chassis 10 to substantially the second direction 6.

As illustrated in FIG. 1, the third restraining element 16 of the fixed chassis may be an elongate element that extends in the second direction 6 and the fourth restraining element 36 of the movable chassis 30 may be an engaging element that engages with the first elongate element. In the illustrated example of FIG. 1, the elongate element is a slot that receives the pin 36 which also operates as a follower.

Figure 5:
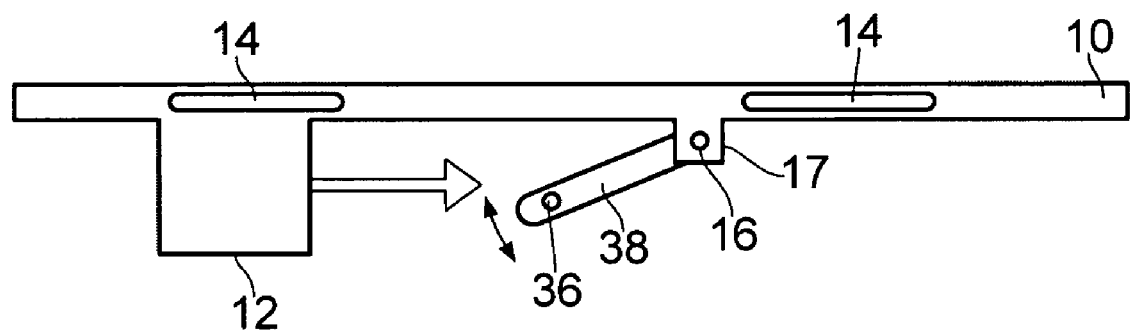
FIG. 5 schematically illustrates an embodiment in which a rotatable mechanical linkage interconnecting the fixed chassis and the movable chassis substantially constrains the movement of the movable chassis to the second direction.

In the illustrated example of FIG. 5, the fourth restraining element of the movable chassis comprises a mechanical linkage 38 that joins the fixed chassis 10 and the movable chassis 30. The mechanical linkage (stiff rod) 38 is mounted at a first end for rotation about the follower 36 of the movable chassis 30. The mechanical linkage 38 is mounted at a second end for rotation about a pivot 16 of the second portion 17 of the fixed chassis. The arc of movement defined by rotation of the mechanical linkage 38 about the pivot 16 is substantially in the second direction 6.

Figure 2:
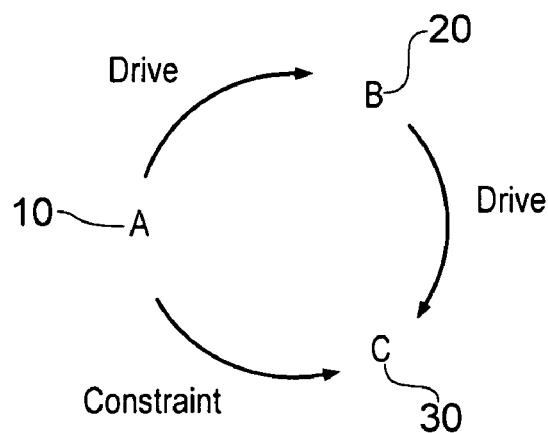
FIG. 2 schematically illustrates how the fixed chassis, the driving chassis and the movable chassis interact.

FIG. 2 schematically illustrates how the fixed chassis 10, the intermediate chassis 20 and the movable chassis 30 interact. The fixed chassis 10 is used to provide a driving force to the intermediate chassis 20 that moves it in at least the first direction 4. The intermediate chassis 20 drives movement of the movable chassis towards both the first and second directions. However, the fixed chassis 10 constrains movement of the movable chassis 30 to substantially the second direction 6.

The manner in which fixed chassis 10 constrains movement of the movable chassis 30 to substantially the second direction 6 can be appreciated from FIGS. 1 and 5. In the illustrated example of FIG. 1, the fourth restraining element (pin 36) of the movable chassis 30 and the third restraining element (slot 16) of the fixed chassis 10 interact to restrain relative movement between the movable chassis 30 and the fixed chassis 10 to substantially the second direction 6. In the illustrated example of FIG. 5, the fourth restraining element (mechanical linkage 38) of the movable chassis 30 and the third restraining element (pivot 16) of the fixed chassis 10 interact to restrain relative movement between the movable chassis 30 and the fixed chassis 10 to substantially the second direction 6.

The manner in which the intermediate chassis drives the movable chassis 30 may be appreciated from FIGS. 4A to 4E.

The Figs illustrate the reciprocating movement of an example of the intermediate chassis 20 The intermediate chassis 20 moves in the first direction 4 from an extreme left-hand position (FIG. 4A) through a central position (FIG. 4B) to an extreme right-hand position (FIG. 4C). This completes a forwards stroke of the reciprocating motion. The intermediate chassis 20 then moves left in the first direction from the extreme right-hand position (FIG. 4C) through the central position (FIG. 4D) to the extreme left-hand position (FIG. 4E). This completes a backwards stroke of the reciprocating motion.

The follower 36 of the movable chassis 30 does not move in the first direction 4. The movement of the movable chassis 30 is constrained by the fixed chassis 10 to substantially the second direction 6. The follower 36 is therefore constrained to move in the second direction 6. The fixed position of the follower 36 in the first direction is illustrated by the alignment of the follower 36 with the line 40 in each of FIGS. 4A-4E.

As a forward stroke of the reciprocating motion occurs, the reaction surface 22 of the slot 28 pushes the follower 36 and the movable chassis 30 upwards in the second direction 6 from height H1 (FIG. 4A), through height H2 (FIG. 4B) to height H3 (FIG. 4C).

As a backward stroke of the reciprocating motion occurs, the reaction surface 22 of the slot 28 pulls the follower 36 and the movable chassis 30 downwards in the second direction from height H3 (FIG. 4C), through height H2 (FIG. 4D) to height H1 (FIG. 4E).

Figure 6A:
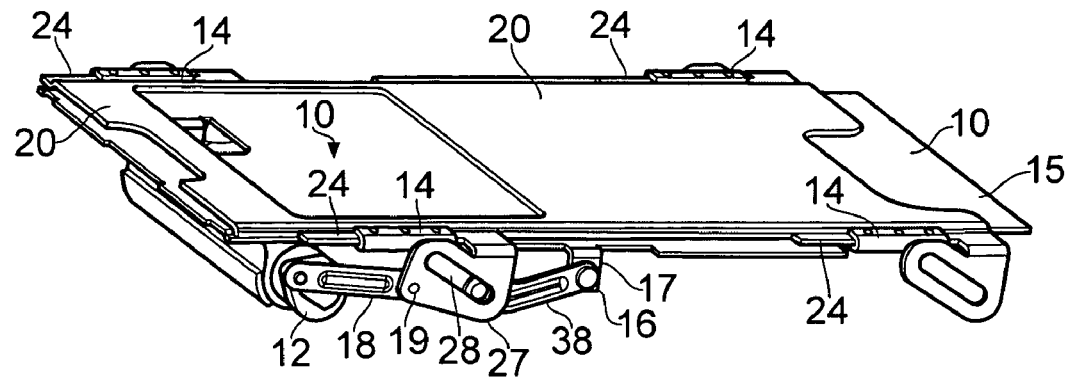
FIG. 6A illustrates an arrangement that includes the fixed chassis and the intermediate chassis but not the movable chassis from a top perspective view.
Figure 6B:
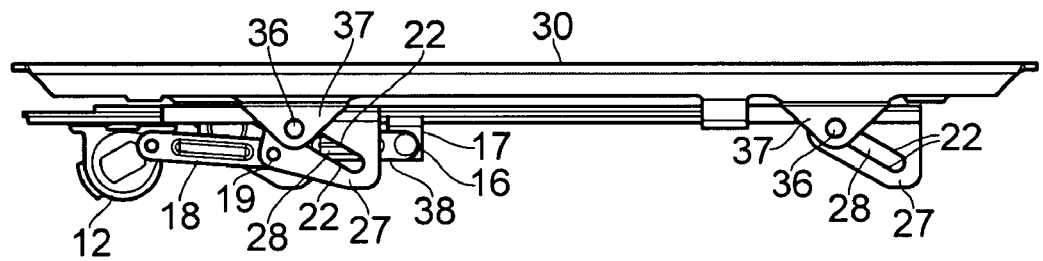
FIG. 6B illustrates the arrangement of FIG. 6A, with the addition of the movable chassis 30, from a side view.
Figure 6C:
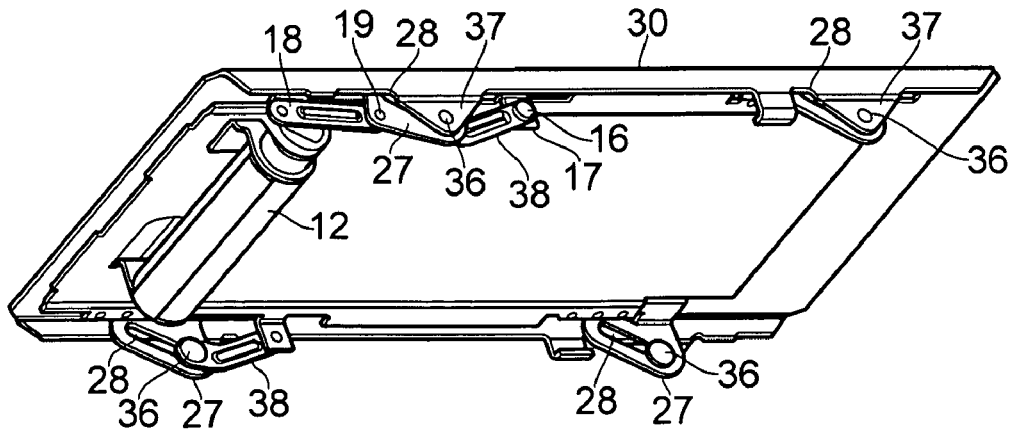
FIG. 6C illustrates the arrangement of FIG. 6B from a bottom perspective view.

FIG. 6A illustrates an arrangement that includes the fixed chassis 10 and the intermediate chassis 20 but not the movable chassis 30 from a top perspective view. FIG. 6B illustrates the arrangement of FIG. 6A, with the addition of the movable chassis 30, from a side view. FIG. 6C illustrates the arrangement of FIG. 6B from a bottom perspective view These figures illustrate an example of an implementation of the apparatus 2. This implementation uses a fourth restraining element of the movable chassis 30 similar to that illustrated in FIG. 5. The fourth restraining element of the movable chassis comprises a mechanical linkage 38 that joins the fixed chassis 10 and the movable chassis 30. The stiff mechanical linkage 38 is mounted at a first end for rotation about the follower 36 of the movable chassis 30. The mechanical linkage 38 is mounted at a second end for rotation about a pivot 16 of the second portion 17 of the fixed chassis 10. The arc of movement defined by rotation of the mechanical linkage 38 about the pivot 16 is substantially in the second direction 6.

These Figures also illustrate an example of a drive train 18 between the fixed chassis 10.

The drive train provides the energy by which the movable chassis 30 may be raised relative to the fixed chassis 10 to create the expanded configuration and subsequently at a later time lowered into the housing using the motor to create the compact configuration.

The drive train 18, in this example, is powered by a motor 12. The motor 12 rotates an eccentric which drives a rod connected to the intermediate chassis 20 via a pivot 19. The rod transfers the driving force 13 against the intermediate chassis 20.

In other implementations, the drive train 18 may be powered by an energy store such as a mechanical energy store. A mechanical energy store may store energy by the compression of a rigid material (e.g. a spring) or by the compression of a fluid (e.g. a hydraulic ram). The energy store may store energy as a consequence of a user forcing the apparatus 2 to change from the expanded configuration to the compact configuration.

In the example illustrated in FIGS. 4A to 4E, the reaction surface 22 is defined by a slot and the follower 36 is defined by a pin. However in other implementations, the reaction surface 22 may be defined by a pin and the follower 36 may be defined by a slot. The purpose of the reaction surface 22 is to provide a surface of the intermediate (driving) chassis 20 that is driven into the follower 36 of the movable chassis 30 to generate a reaction force. The reaction force applied to the movable chassis 30 via the follower 36 may have a component in the first direction 4 and a component in the second direction 6. However, movement of the movable chassis 30 is constrained such that it moves substantially in only the second direction 6.

FIGS. 7A to 7D illustrate some alternative arrangements of reaction surface 22 and follower 36.

In the FIGS. 7A to 7D, the broad arrow 70 illustrates the direction in which the intermediate chassis 20 and its reaction surface 22 moves. The thinner arrows F1, F2 illustrate the components in the first direction 4 and the second direction 6 of the force generated by the abutment of the reaction surface 22 of the intermediate chassis 20 and the follower 36 of the movable chassis 30. One or more constraints 72 are applied to constrain movement of the movable chassis 30 to substantially only the second direction 6. The constrained force component in the first direction that does not result in movement of the movable chassis 30 is illustrated using a dotted line. The unconstrained force component in the second direction that does result in movement of the movable chassis 30 is illustrated using a solid line.

The constraint may, for example, be provided by any suitable arrangement. Examples of suitable constraints have been discussed previously with reference to FIGS. 1 and 5.

In each of the different examples illustrated in FIGS. 7A to 7D, the intermediate chassis 20 and its reaction surface 22 move at least in the first direction 4.

In each of the examples, the abutment of the reaction surface 22 and the follower 36 generate forces F1, F2 in both the first and second directions.

In each of the examples, the movable chassis 30 is constrained so that it moves predominantly in response to the force component F2 in the second direction 6 compared to movement in the first direction 4.

Figure 7A:
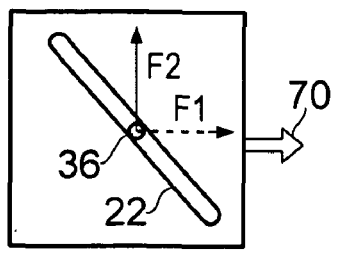
FIGS. 7A to 7D illustrate some alternative arrangements of a reaction surface and follower for converting movement of the intermediate chassis to movement of the movable chassis.
Figure 7A:
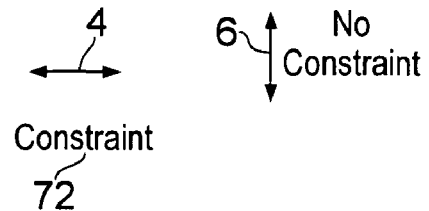
Figure 7B:
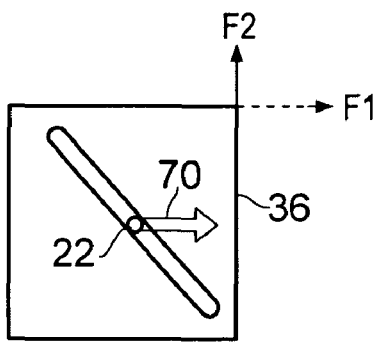
Figure 7B:
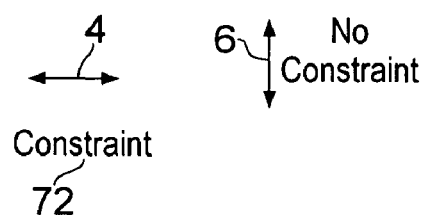
Figure 7C:
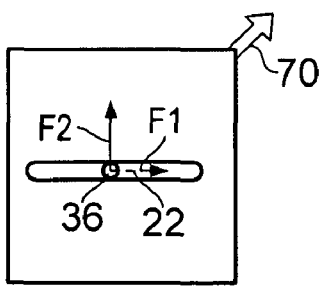
Figure 7C:
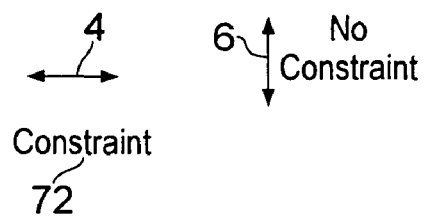
Figure 7D:
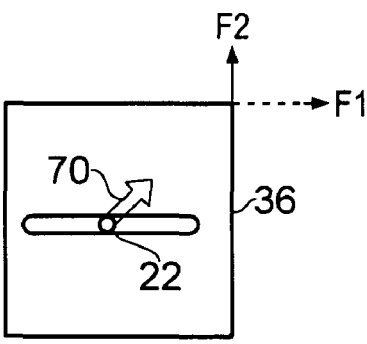
Figure 7D:
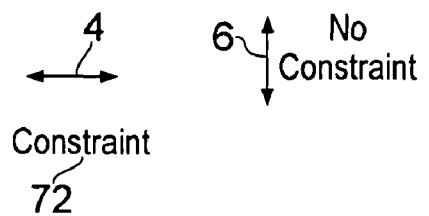

One difference between the Figs is whether the reaction surface 22 is defined either by a slot in the intermediate chassis 20 (FIGS. 7A and 7C) or by a pin attached to the intermediate chassis 20 (FIGS. 7B and 7D). Another difference is whether the driving movement of the intermediate chassis is in only the first direction (FIGS. 7A and 7B) or has components in both the first and second directions (FIGS. 7C and 7D). The angle of the slot between the first and second directions can be varied to create a transformer or guide that converts movement of the intermediate chassis 20 along one vector to movement of the movable chassis 30 along a different vector without inverting any component of the vector e.g. without bouncing.

The arrangement illustrated in FIG. 7A is used, for example, in the examples illustrated in FIGS. 1, 3, 4A-4E, 5 and 6A-6C. In these examples, the reaction surface 22 is provided by a sliding slot.

In the illustrated examples of FIGS. 1 and 3, the fourth restraining element (pin 36) of the movable chassis 30 and the third restraining element (slot 16) of the fixed chassis 10 interact to constrain relative movement between the movable chassis 30 and the fixed chassis 10 to substantially the second direction 6.

In the illustrated example of FIGS. 5 and 6A to 6C, the fourth restraining element (mechanical linkage 38) of the movable chassis 30 and the third restraining element (pivot 16) of the fixed chassis 10 interact to constrain relative movement between the movable chassis 30 and the fixed chassis 10 to substantially the second direction 6.

The arrangement illustrated in FIG. 7D is used, for example, in the examples illustrated in FIGS. 8A-8B and 9A-9B. In these examples, the reaction surface 22 is provided by a rotating pin 80 which is located within a slot 82 of the follower 36.

Figure 8A:
FIGS. 8A and 8B schematically illustrate the use of a rotating pin as a reaction surface and the use of a pin in slot as a constraint.
Figure 8B:
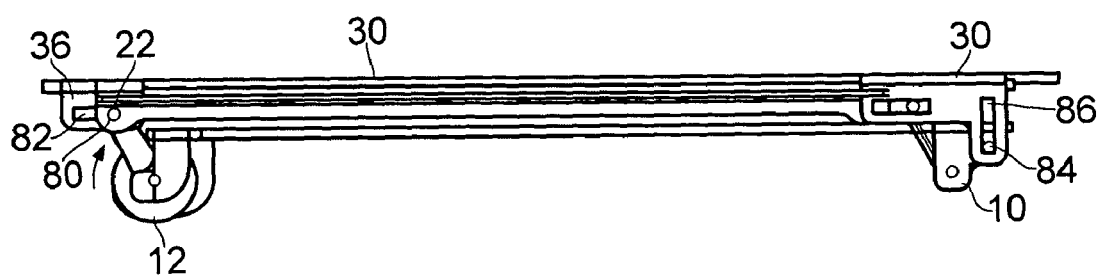

Referring to the FIGS. 8A-8B, the drive mechanism rotates the pin 80 clockwise between FIGS. 8A and 8B. The slot 82 extends in the first direction and as the pin 80 rotates clockwise it moves in the first direction within the slot 82 and provides an upwards reaction force to the follower 36 of the movable chassis 30 which consequently moves upwards.

The movable chassis 30 comprises as the fourth restraining element a downwardly extending slot 86 that receives, as the third restraining element, a pin 84 of the fixed chassis 10. The movement of the pin 84 in the slot 86 constrains the movement of the movable chassis 30 to substantially the second direction only.

Figure 9A:
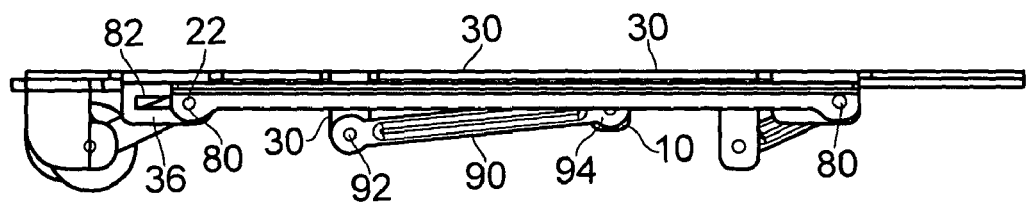
FIGS. 9A and 9B schematically illustrate the use of a rotating pin as a reaction surface and the use of a rotating mechanical linkage as a constraint.
Figure 9B:
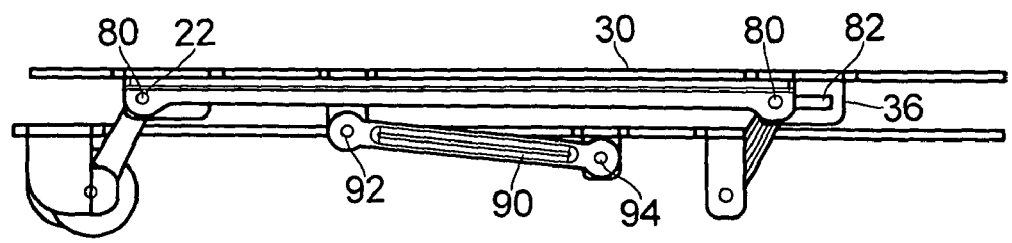

Referring to the FIGS. 9A-9B, the drive mechanism rotates the pin 80 anti-clockwise between FIGS. 9A and 9B. The slot 82 extends in the first direction and as the pin 80 rotates clockwise it moves in the first direction within the slot 82 and provides an upwards reaction force to the follower 36 of the movable chassis 30 which consequently moves upwards.

The fourth restraining element of the movable chassis 30 comprises a mechanical linkage 90 that joins the fixed chassis 10 and the movable chassis 30. The stiff mechanical linkage 90 is mounted at a first end for rotation about a pivot 92 of the movable chassis 30. The mechanical linkage 38 is mounted at a second end for rotation about a pivot 94 of the fixed chassis 10. The arc of movement defined by rotation of the mechanical linkage 90 about the pivot 94 is substantially in the second direction 6 constraining movement of the movable chassis 30 to substantially the second direction. The direction of rotation of the mechanical linkage about the pivot 94 is opposite to the direction of rotation of the pin 80.

The movable chassis 30 may support a movable housing portion having one or more component parts.

Figure 10A:
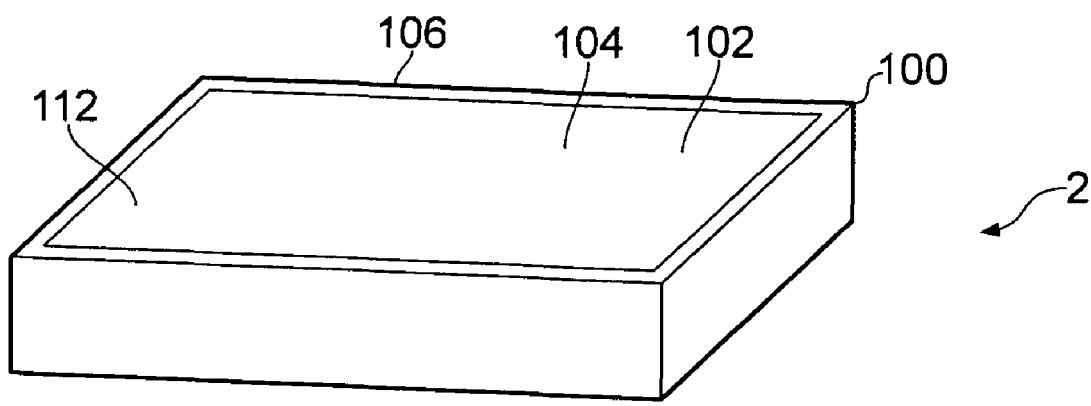
FIGS. 10A and 10B schematically illustrate an example of an apparatus 2 in a compact configuration and in an expanded configuration.
Figure 10B:
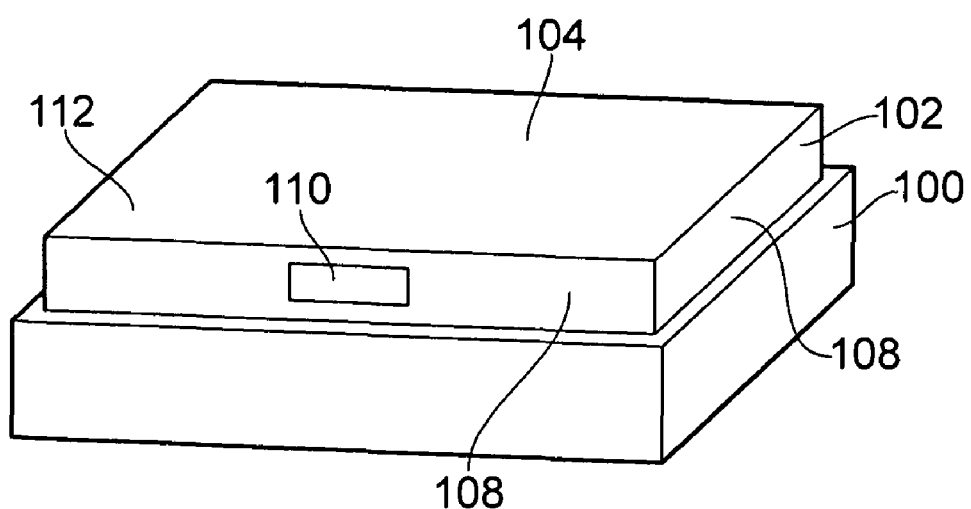

FIGS. 10A and 10B schematically illustrate an example of an apparatus 2. FIG. 10A schematically illustrates the apparatus 2 in a compact configuration. FIG. 10B schematically illustrates the apparatus 2 in an expanded configuration.

The apparatus comprises a housing having a first circumscribing housing portion 100 that surrounds on five sides a second movable housing portion 102. The first circumscribing housing portion 100 defines a cavity size to receive all or part of the second movable housing portion 102.

In the example of the compact configuration illustrated in FIG. 10A, an upper face 104 of the movable housing portion 102 and a circumscribing upper face 106 of the circumscribing housing portion 100 are flush, that is, they are at the same level such that there is no or little step between them.

In the example of the expanded configuration illustrated in FIG. 10B, the upper face 104 of the movable housing portion 102 and the circumscribing upper face 106 of the circumscribing housing portion 100 are not flush, that is, they are at different levels such that there is a step between them.

The housing of the apparatus 2 comprises: the fixed chassis 10, the intermediate chassis 20 and the movable chassis 30 (not illustrated in FIGS. 10A and 10B). The fixed chassis 10 may, for example, be fixed to the circumscribing housing portion 100 and the movable chassis 30 may support the movable housing portion 100. The described movement of the movable chassis 30 away from the fixed chassis 10 in the second direction raises the movable housing portion 100 forming the expanded configuration illustrated in FIG. 10B. The described movement of the movable chassis 30 towards the fixed chassis 10 in the second direction lowers the movable housing portion 100 forming the compact configuration illustrated in FIG. 10A.

The movable housing portion 100 may comprise one or more functional component parts. An example of a functional component part is an interface component 110 that allows a user or other apparatus to interface with the apparatus 2.

The movable housing portion 100 may have a front face 104 and circumscribing side faces 108. The front face 104 may be exposed whenever the apparatus 2 is in the compact configuration and also when the apparatus is in the expanded configuration. Portions of the side faces 108 may be exposed whenever the apparatus is in the expanded configuration (FIG. 10B) but concealed within a cavity of the housing portion 100 when the apparatus is in the compact configuration (FIG. 10A).

One or more interface components 110 may be positioned on one or more of the exposed/concealed side faces 108 and/or may be positioned on the front face 104.

A user interface component 110 may be an output user interface component that produces an output to a user. An example of an output user interface component is a display or a touch sensitive display or an audio output port. As an example, a display or touch sensitive display 112 may be positioned to define at least a portion of the front face 104 of the movable housing portion 102. As an example, an audio output port 110 may be positioned at a exposed/concealed side face 108 of the movable housing portion 102 so that it is only usable when the apparatus is in the expanded configuration (FIG. 10B).

A user interface component 110 may be an input user interface component that enables a user to provide input to the apparatus 2. An example of an input user interface component is a key or key mat or a touch sensitive display or an audio input port. As an example, a key mat may be positioned to define at least a portion of the front face 104 of the movable housing portion 102. As an example, a key and/or an audio input port 110 may be positioned, as illustrated in FIG. 10B, at exposed/concealed side face(s) of the movable housing portion so that it is only usable when the apparatus is in the expanded configuration (FIG. 10B).

One example of an interface component 110 is a galvanic interface. A galvanic interface component has one or more galvanic connectors that enable another device to be electrically connected to the apparatus. This may occur by insertion of the another device or an interface portion of the another device into the galvanic interface. As an example, a galvanic interface may be positioned at an exposed/concealed side face 108 of the movable housing portion 102 so that it is only usable when the apparatus is in the expanded configuration (FIG. 10B).

One example of an interface component 110 is an insertion interface component. An insertion interface component enables another device to be added to the apparatus 2 by insertion of the another device or a portion of the another device into the insertion interface. This may occur by insertion of the another into a receptacle or cavity. As an example, the receptacle or cavity may be positioned at exposed/concealed side face(s) 108 of the movable housing portion so that it is only usable when the apparatus is in the expanded configuration (FIG. 10B).

One example of an interface component is a card interface component. A card interface component enables a card to be physically connected to the apparatus 2. This may occur by insertion of the card into a receptacle or cavity. The card may be, for example, a memory card such as, for example, a Secure Digital (SD) memory card. The card may be, for example, a smart card such as for example a Subscriber Identity Module (SIM) or User Identity Module (UIM) or another form of security module or authentication module or encryption module. As an example, the receptacle or cavity may be positioned at exposed/concealed side face(s) 108 of the movable housing portion 102 so that is only usable when the apparatus 2 is in the expanded configuration (FIG. 10B).

Thus movement of the movable chassis 30 may thus expose/hide functional components. The movement of the movable chassis 30 to a raised position where functional devices are exposed may occur when the apparatus becomes active. The movement of the movable chassis 30 to a lowered position where functional devices are hidden may occur when the apparatus becomes inactive.

Active and inactive refer to states of the apparatus. They may be power states such as 'on' and 'off'. Alternatively they may be system states such as sleep/lock and idle/unlock.

The movement of the movable chassis 30 to a raised position where functional devices are exposed may occur in response to a user input command.

It should of course be appreciated that although reciprocation has been referred to in the preceding paragraphs, adjacent forward and backward strokes of reciprocated movement may be separated by a significant time delay. For example, the forward stroke may occur when the apparatus becomes active and the backward stroke may only occur when the apparatus becomes inactive.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a driving chassis configured to move in at least a first direction and configured to define a reaction surface;
   a movable chassis configured to move in at least a second direction orthogonal to the first direction and configured to define a follower; and
   a fixed chassis supporting a drive mechanism configured to drive the driving chassis in at least the first direction relative to the fixed chassis;
   wherein the reaction surface and follower interact to convert movement of the driving chassis and reaction surface in the first direction to movement of the follower and movable chassis in the second direction, and wherein the driving chassis comprises at least a third restraining element that interacts with a fourth restraining element of the movable chassis to restrain relative movement between the movable chassis and the fixed chassis to substantially the second direction, and wherein the follower forms a part of the fourth restraining element.

2. An apparatus as claimed in claim 1, wherein the driving chassis is constrained by the fixed chassis to move in the first direction.

3. An apparatus as claimed in claim 1, wherein the fixed chassis comprises at least a first restraining element that interacts with at least a second restraining element of the driving chassis to restrain relative movement of the driving chassis and the fixed chassis to the first direction.

4. An apparatus as claimed in claim 3, wherein interaction of a first restraining element and a second restraining element involves interaction of a first elongate element that extends in the first direction and a first engaging element that engages with the first elongate element.

5. An apparatus as claimed in claim 3, wherein the first restraining element comprises a first elongate element that extends in the first direction and the second restraining element comprises a first engaging element that engages with the first elongate element.

6. An apparatus as claimed in claim 5, wherein multiple distinct first elongate elements are positioned in the first direction at a periphery of the fixed chassis.

7. An apparatus as claimed in claim 1, wherein the movable chassis is constrained by the fixed chassis to move in the second direction.

8. An apparatus as claimed in claim 1, wherein the follower forms a pivot for a mechanical linkage.

9. An apparatus as claimed in claim 1, wherein the reaction surface and follower interact to convert movement of the driving chassis in the first direction to movement of the movable chassis in the second direction.

10. An apparatus as claimed in claim 1, wherein the reaction surface and follower interact to convert reciprocating movement of the driving chassis in the first direction to reciprocating movement of the movable chassis in the second direction.

11. An apparatus as claimed in claim 1, wherein the reaction surface and the follower comprise a slot and a pin in the slot.

12. An apparatus as claimed in claim 11, wherein the slot is a slot having a displacement intermediate of the first and second direction.

13. An apparatus as claimed in claim 1, wherein the movable chassis supports a movable housing portion having an interface component in a side wall.

14. A hand portable electronic apparatus comprising:
    a fixed chassis;
    a driving chassis configured to move relative to the fixed chassis in at least a first direction and configured to define a reaction surface;
    a movable display chassis, supporting a display, constrained to move relative to the fixed chassis in substantially a second direction orthogonal to the first direction and configured to define a follower,
    wherein the fixed chassis comprises a drive mechanism arranged to drive the driving chassis and wherein the reaction surface and follower interact to convert movement of the driving chassis in the first direction to movement of the movable display chassis in the second direction, the fixed chassis supporting the drive mechanism configured to drive the driving chassis in at least the first direction relative to the fixed chassis, wherein the driving chassis comprises at least a third restrains element that interacts with a fourth restraining element of the movable display chassis to restrain relative movement between the movable display chassis and the fixed chassis to substantially the second direction, and wherein the follower forms a part of the fourth restraining element.

15. An apparatus comprising:

a first movable housing portion having side faces comprising one or more interface components;

a second housing portion, wherein the first movable housing portion is movable relative to the second housing portion between a compact configuration in which the one or more interface components are obscured by the second housing portion and an expanded configuration in which the one or more interface components are exposed;

a driving chassis configured to move in at least a first direction and configured to define a reaction surface;

a movable chassis configured to move in at least a second direction orthogonal to the first direction and configured to define a follower; and fixed chassis supporting a drive mechanism configured to drive the driving chassis in at least the first direction relative to the fixed chassis wherein the reaction surface and follower interact to convert movement of the driving chassis and reaction surface in the first direction to movement of the follower and movable chassis in the second direction, wherein the movable chassis supports and moves the first movable housing portion, wherein the driving chassis comprises at least a third restraining element that interacts with a fourth restraining element of the movable chassis to restrain relative movement between the movable chassis and the fixed chassis to substantially the second direction, and wherein the follower forms a part of the fourth restraining element.

16. An apparatus as claimed in claim 15, wherein the interface component is selected from the group comprising: a user interface component; output user interface component; audio output port; input user interface component, key, audio input port; galvanic interface component, insertion interface component, and card interface component.

* * * * *

UNITED STATES PATENT AND TRADEMARK OFFICE
CERTIFICATE OF CORRECTION

| | | |
|---|---|---|
| PATENT NO. | : 8,213,181 B2 | Page 1 of 1 |
| APPLICATION NO. | : 12/459232 | |
| DATED | : July 3, 2012 | |
| INVENTOR(S) | : Grant et al. | |

It is certified that error appears in the above-identified patent and that said Letters Patent is hereby corrected as shown below:

Claim 14, col. 11, line 6 delete "restrains" and insert --restraining--.

Signed and Sealed this
Twenty-eighth Day of August, 2012

David J. Kappos
*Director of the United States Patent and Trademark Office*